US009548622B2

(12) United States Patent
Vick et al.

(10) Patent No.: US 9,548,622 B2
(45) Date of Patent: Jan. 17, 2017

(54) WIRELESSLY CHARGING A MOBILE DEVICE AND UTILIZING THE MOBILE DEVICE AS A POWER SOURCE

(71) Applicant: Wistron Corporation, New Taipei (TW)

(72) Inventors: Ronald Vick, Rolling Meadows, IL (US); Thomas Oberhauser, Rolling Meadows, IL (US)

(73) Assignee: Wistron Corporation, New Taipei (TW)

( * ) Notice: Subject to any disclaimer, the term of this patent is extended or adjusted under 35 U.S.C. 154(b) by 232 days.

(21) Appl. No.: 14/305,847

(22) Filed: Jun. 16, 2014

(65) Prior Publication Data

US 2015/0364943 A1    Dec. 17, 2015

(51) Int. Cl.
*H02J 7/00* (2006.01)
*H02J 17/00* (2006.01)
*H02J 7/02* (2016.01)

(52) U.S. Cl.
CPC ............. *H02J 7/025* (2013.01); *H02J 50/10* (2016.02); *H02J 2007/0096* (2013.01)

(58) Field of Classification Search
None
See application file for complete search history.

(56) References Cited

U.S. PATENT DOCUMENTS

| | | | | |
|---|---|---|---|---|
| 7,791,311 B2* | 9/2010 | Sagoo | ..................... | H02J 7/025 320/103 |
| 7,889,498 B2* | 2/2011 | Diebel | .................. | G06F 1/1628 361/679.41 |
| 7,936,147 B2* | 5/2011 | Kook | ................... | H02J 7/0044 320/108 |
| 8,390,255 B1* | 3/2013 | Fathollahi | ............. | H02J 7/0045 206/308.3 |

(Continued)

FOREIGN PATENT DOCUMENTS

CN           102738869 A     10/2012
KR    1020050000780 A  *   1/2005  ............... H04B 1/40

OTHER PUBLICATIONS

Panasonic, MTM68411 Silicon P-channel MOS FET, 3 pages (Jan. 2012).

(Continued)

*Primary Examiner* — Leigh Garbowski
(74) *Attorney, Agent, or Firm* — Leydig, Voit & Mayer, Ltd.

(57) ABSTRACT

An apparatus is provided for wirelessly charging a mobile computing device and utilizing the mobile computing device as a power source. The apparatus includes: a first data and power interface; a second data and power interface; a wireless charging unit; and a control unit. The operation of the wireless charging unit and the control unit is configured to provide a first mode of operation of the apparatus when an external source connected to the apparatus via the second data and power interface is a load device in which power is (Continued)

delivered from the mobile computing device to the load device via the first and second data and power interfaces, and a second mode of operation of the apparatus in which power is delivered from a power receiver of the wireless charging unit to the mobile computing device via the first data and power interface.

17 Claims, 10 Drawing Sheets

(56) References Cited

U.S. PATENT DOCUMENTS

| | | | | |
|---|---|---|---|---|
| 9,077,390 | B1* | 7/2015 | Joehren | H04B 5/0037 |
| 9,123,935 | B2* | 9/2015 | Huang | H01M 10/46 |
| 9,197,094 | B2* | 11/2015 | Van Wiemeersch | H02J 7/025 |
| 9,288,295 | B2* | 3/2016 | Ivanovski | H04B 1/3816 |
| 9,318,915 | B2* | 4/2016 | Miller | H02J 7/025 |
| 2011/0199041 | A1* | 8/2011 | Yang | H01M 10/46 |
| | | | | 320/101 |
| 2013/0175983 | A1* | 7/2013 | Partovi | H01F 5/003 |
| | | | | 320/108 |
| 2013/0278207 | A1* | 10/2013 | Yoo | H02J 7/025 |
| | | | | 320/108 |
| 2013/0285601 | A1* | 10/2013 | Sookprasong | H02J 7/025 |
| | | | | 320/108 |
| 2014/0203661 | A1* | 7/2014 | Dayan | H01F 38/14 |
| | | | | 307/104 |
| 2014/0285137 | A1* | 9/2014 | Shapley | H02J 7/0045 |
| | | | | 320/107 |
| 2014/0308995 | A1* | 10/2014 | Wu | H02J 7/007 |
| | | | | 455/573 |
| 2015/0015187 | A1* | 1/2015 | Xiang | H02J 7/007 |
| | | | | 320/107 |
| 2015/0194834 | A1* | 7/2015 | Lee | H02J 7/0052 |
| | | | | 320/107 |

OTHER PUBLICATIONS

Texas Instruments, "Integrated Wireless Power Supply Receiver, Qi (Wireless Power Consortium) Compliant" 30 pages (2011).

* cited by examiner

WIRELESSLY CHARGING A MOBILE DEVICE AND UTILIZING THE MOBILE DEVICE AS A POWER SOURCE

BACKGROUND

Wireless charging technologies have found application in the field of mobile computing devices and accessories pertaining thereto, particularly with respect to smartphones. Two general types of wireless charging currently exist, including magnetic induction-type charging and magnetic resonance-type charging. Of these two types, magnetic induction-type wireless charging components are relatively more common.

Magnetic induction-type charging standards are set by a standards body, and a prominent magnetic induction-type charging standard that currently exists is the Qi (Chi) standard. Using the Qi standard, mobile computing devices are available to receive 5 W of wireless power transferred over distances of up to 4 cm. A typical wireless charging configuration using the Qi standard includes a power receiver having an RX antenna coil with a power receiver integrated circuit (IC), which receives power from a wireless charging pad having a TX antenna coil when the RX antenna coil is placed in alignment with the TX antenna coil.

Magnetic induction-type charging is available in mobile computing devices, such as smartphones, equipped with a wireless charging unit having an RX antenna coil and a corresponding IC. For smartphones that are not equipped with a wireless charging unit, smartphone cases have been developed that allow for the case, which includes a wireless charging unit, to be plugged into a smartphone to provide wireless charging functionality to the smartphone. However, the existing products typically use proprietary standards and are not Qi compatible, and additionally monopolize the smartphones' power and data port (for example, the mini-Universal Serial Bus (USB) port in Android and Windows-compatible phones and the "lightning" port in recent Apple smartphones) such that other uses of the port (whether for power or for data) become unavailable.

SUMMARY

Embodiments of the invention provide an apparatus, such as a smartphone accessory, configured to be operated in different modes such that wireless charging may be provided to a mobile computing device connected to the apparatus without sacrificing other functionality available to the mobile computing device while the apparatus is connected, including operation of the mobile computing device as a power source for a load device connected thereto (for example, using the USB On-The-Go (OTG) standard to connect and power peripheral load devices or other mobile computing devices).

Further embodiments provide systems, which may include a standalone apparatus for wireless charging or may be integrated into a mobile computing device without a standalone apparatus, that are similarly configured to be operated in different modes, as well as methods for providing wireless charging functionality and other functionality in different modes.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
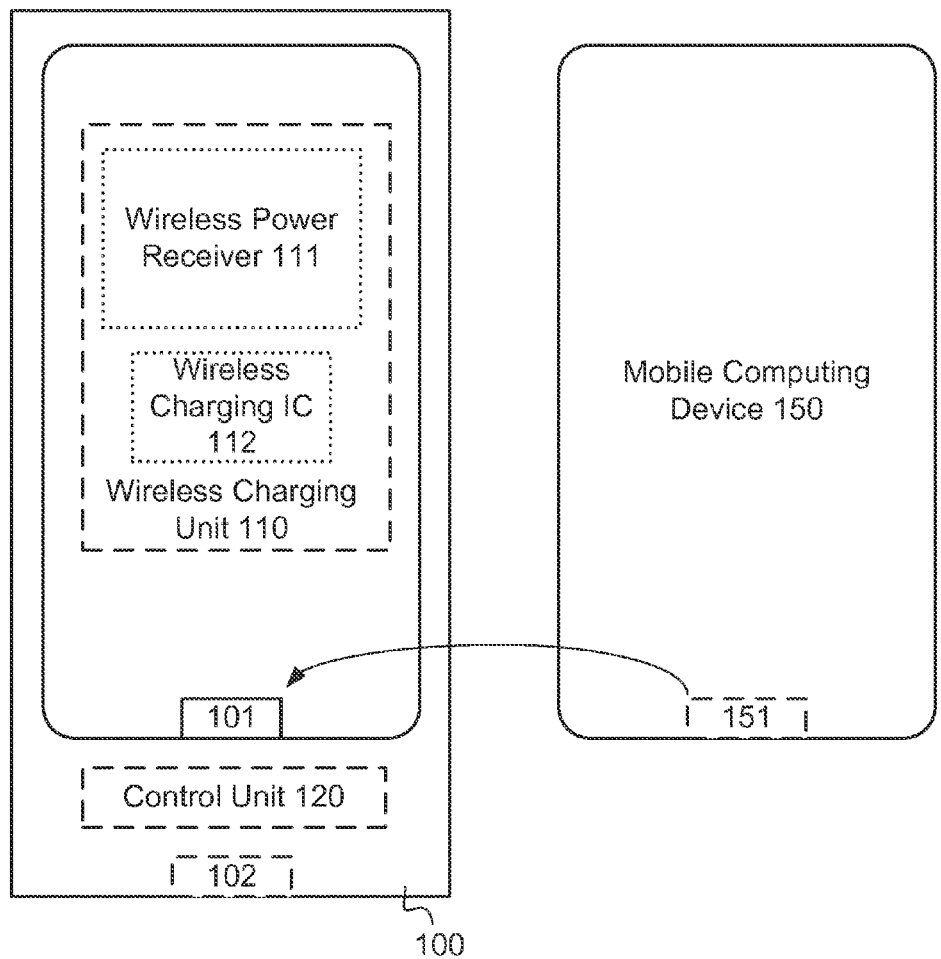
FIG. 1 is a block diagram illustrating an apparatus and a mobile computing device in an exemplary embodiment.

FIG. 1 is a block diagram illustrating an exemplary embodiment of the inventive principles. In this exemplary embodiment, an apparatus 100 is depicted that includes a first data and power interface 101 (for example, a mini-USB connector adapted to mate with a mini-USB port of a mobile computing device), a second data and power interface 102 (for example, a mini-USB port adapted to accept a mini-USB-compatible connector), and internally includes a wireless charging unit 110 and a control unit 120. The two data and power interfaces 101 and 102 are capable of transmitting power and/or data to and/or from a mobile computing device 150 that is joined with the apparatus 100 (i.e., when the first data and power interface 101 is connected to a data and power interface port 151 of the mobile computing device 150). The wireless charging unit 110 further includes a wireless power receiver 111 and a wireless charging integrated circuit (IC) 112. In one exemplary implementation, the wireless charging unit 110 is a Qi-compatible magnetic induction-type wireless charging unit that includes an RX antenna coil as the wireless power receiver 111 and a Qi-compatible IC as the wireless charging IC 112 (for example, the Texas Instruments (TI) BQ51013 wireless charge IC). The control unit 120 includes circuitry connected to the first and second data and power interfaces 101 and 102 and to the wireless charging unit 110 that, together with the wireless charging unit 110, facilitates switching the apparatus 100 between different modes of operation under different conditions. In certain exemplary implementations, the control unit 120 includes few circuit components suitably connected to the other elements of the apparatus 100. In other alternative exemplary implementations, the control unit 120 includes a processor-based controller utilizing processor-executable instructions stored on a non-transitory processor-readable medium to switch the apparatus 100 between different modes of operation.

FIG. 1 further depicts a mobile computing device 150, which includes a data and power port 151, adapted to be joined with the apparatus 100 in a manner such that the data and power port 151 mates with the first data and power interface 101 so as to establish a connection through which power and/or data may be transmitted to and/or from the mobile computing device 150. It will be appreciated that the various mobile computing devices usable in connection with various embodiments of the invention may include, without limitation, mobile phones (including smartphones), tablets and "phablets," laptop computers, headset accessories, drone aircrafts or other electronic vehicles, video game systems, television remotes, and microcontroller circuits (such as Raspberry Pi, BeagleBone, etc.). It will further be appreciated that the mobile computing devices should be configured such that they are able both to provide and receive power and data via a data and power interface of the mobile computing devices (e.g., a USB OTG-enabled smartphone having a mini-USB port is able to provide power via the mini-USB port to an external device when a USB OTG-compatible cable/connector is present).

In different embodiments involving different types of mobile computing devices 150 having different dimensions, the apparatus 100 takes on different forms and dimensions corresponding to the different types of mobile computing devices. For example, in an embodiment where the mobile computing device 150 is a smartphone, the apparatus 100 may have the shape of a smartphone case similar to the shape depicted in FIG. 1, with a recessed space adapted to fit the mobile computing device 150. In an alternative embodiment, for example where the mobile computing device 150 is a tablet computer, the apparatus 100 may be a sleeve or a case with a cover, where the sleeve or case includes first and second data and power interfaces 101 and 102. Examples of configurations of the apparatus 100 include, but are not limited to, cases, protective outer shells, sleeves, and standalone adapters or attachments.

Figure 2:
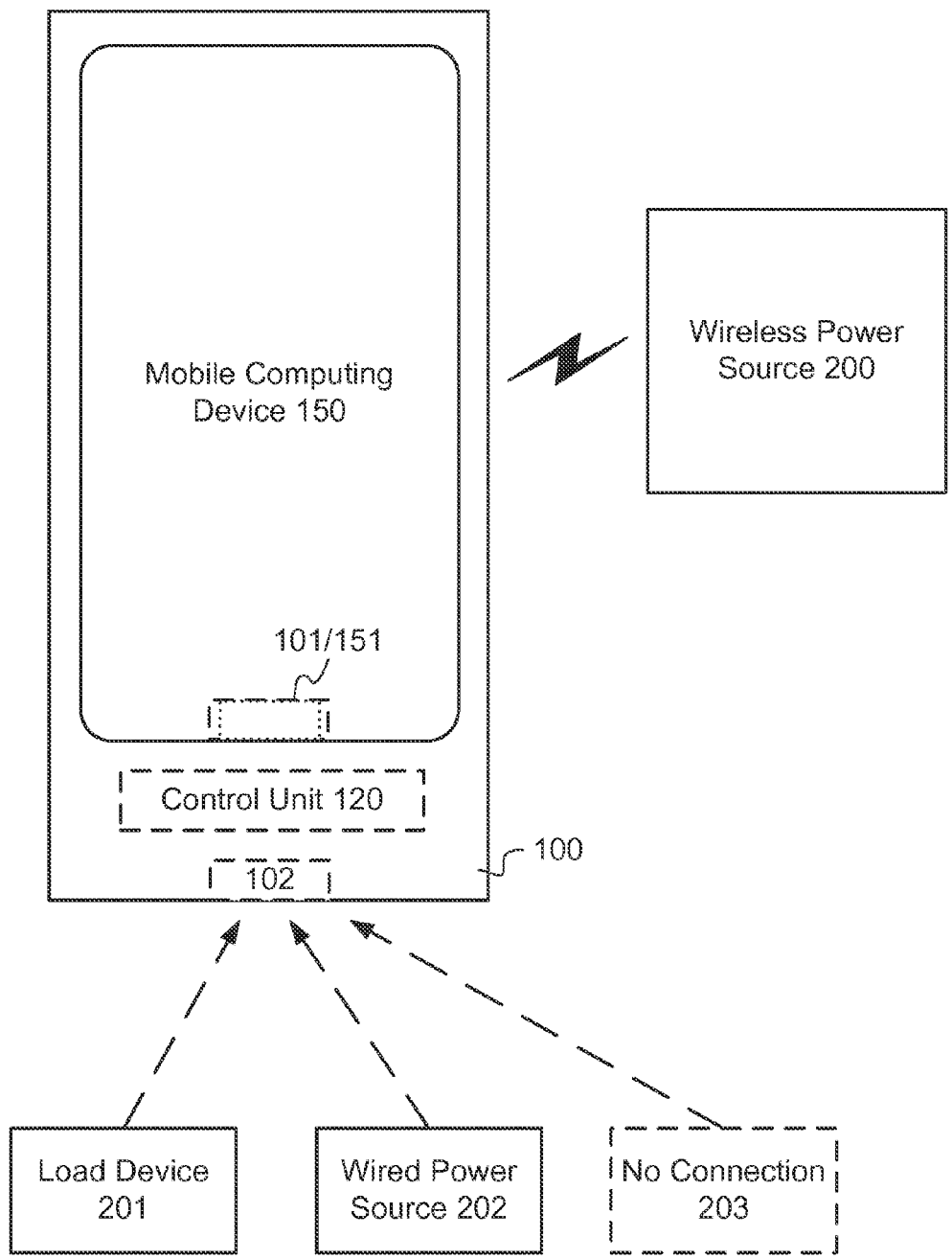
FIG. 2 is a block diagram illustrating difference contexts of operation for an apparatus joined with a mobile computing device in an exemplary embodiment.

FIG. 2 is a block diagram illustrating different contexts of operation for a mobile computing device 150 connected to an apparatus 100 (as described above with respect to FIG. 1). Six different contexts of operation are illustrated with respect to FIG. 2 based on: (1) whether the combined apparatus 100 and mobile computing device 150 is in the presence of a wireless power source 200 (for example, as a Qi-compatible charging pad with a TX antenna coil); and (2) whether a load device 201 (for example, a keyboard or mouse, other accessory, or another mobile computing device) is connected to the second data and power interface 102, a wired power source 202 (for example, an adapter plugged into a wall outlet or another computing device) is connected to the second data and power interface 102, or nothing is connected to the second data and power interface 102 (represented by the box "no connection 203").

In an exemplary embodiment, different modes of operation are provided under different conditions corresponding to two or more of these six different contexts. In one particular exemplary embodiment, the control unit 120 and the wireless charging unit 110 of the apparatus 100 cause the apparatus 100 to behave as shown in the following table:

| | | |
|---|---|---|
| Wireless power source available | Load device connected | Mobile computing device provides power to load device; wireless charging suspended |
| | Wired power source connected | Wired power source provides power to mobile computing device; wireless charging suspended |
| | No connection | Wireless power source provides power to mobile computing device. |
| Wireless power source unavailable | Load device connected | Mobile computing device provides power to load device; wireless charging unavailable |
| | Wired power source connected | Wired power source provides power to mobile computing device; wireless charging unavailable |
| | No connection | No power transfer occurs. |

In this exemplary embodiment, wirelessly charging the mobile computing device 150 via the apparatus 100 will not occur when an external source (whether a load device 201 or a wired power source 202) is connected to the second data and power interface 102 of the apparatus 100, regardless of whether a wireless power source 200 is available to the apparatus 100.

This exemplary embodiment thus provides the user of the mobile computing device 150 and the apparatus 100 with a variety of functionality while the mobile computing device 150 is connected to the apparatus 100. When the user wants to use a load device 201 in connection with the mobile computing device 150, the first and second data and power interfaces 101 and 102 of the apparatus 100 allow the mobile computing device 150 to provide power to the load device 201.

For example, the user may connect a peripheral device such as a mouse or keyboard to the second data and power interface 102, and the peripheral device is provided with power from the mobile computing device 150 (e.g., from a battery of the mobile computing device 150) via the first and second data and power interfaces 101 and 102 of the apparatus 100 (as well as the data and power interface 151 of the mobile computing device 150). Data may also be provided to and/or from the mobile computing device from and/or to the load device 201 (e.g., data corresponding to keystrokes or movement associated with a peripheral device).

Another example of a load device 201 is the connection of another mobile computing device to the mobile computing device 150. For example, when the mobile computing device 150 is a USB OTG-enabled smartphone, a second smartphone (which, for example, may be non-USB OTG-enabled or may be a USB OTG-enabled smartphone connected via a non-USB OTG-compatible USB connector or via the non-USB OTG-enabled end of a USB OTG-compatible USB connector) is connected to the second data and power interface 102, which in this example is a mini-USB port via a USB cable that has male-type mini-USB connectors on both ends. The first USB OTG-enabled smartphone is able to provide power to the second smartphone, and may further be able to exchange data with the second smartphone.

Other examples of load devices 201 include, but are not limited to, a standalone memory drive, such as an external hard drive or a USB flash drive, or a memory reader adapted to read and/or write data from a memory card, which are connectable to the data and power interface 102 to provide power to the load device 201 and to communicate data to and/or from the mobile computing device 150.

In each of these situations where a load device 201 is connected to the apparatus 100, the operation of the control unit 120 in combination with the wireless charging unit 110 is configured such that wireless charging of the mobile computing device 150 does not occur, even if the wireless power source 200 is available.

In the case where a wired power source 202 is available (for example, when the apparatus 100 is connected to a wall outlet using an adapter plugged into the second data and power interface 102), the operation of the control unit 120 in combination with the wireless charging unit 110 also do not allow for wireless charging of the mobile computing device 150 regardless of whether the wireless power source 200 is available or not, as it is generally more efficient to provide wired charging relative to wireless charging.

In another example, the wired power source 202 is a standalone battery or other type of energy storage device. In yet another example, the wired power source 202 is another mobile computing device, such as a laptop or desktop computer or a smartphone, that provides power to the apparatus 100 along a wired connection (e.g., an ordinary USB cable that is not USB OTG-compatible, or a USB OTG-compatible cable) that is plugged into the second data and power interface 102. Where the second data and power interface 102 of the apparatus 100 is connected via a wired connection to an external wired power source, the operation of the control unit 120 and wireless charging unit 110 is configured to determine that power is being input to the apparatus 100 along the second data and power interface 102 and treats the connected device as a wired power source 202. This results in wireless charging being suspended (even if a wireless power source 200 is available), and power flows from the wired power source 202 to the mobile computing device 150.

In the case where neither a load device 201 nor a wired power source 202 are connected and there is no connection 203 at the second data and power interface 102, the operation of the control unit 120 and wireless charging unit 110 causes wireless charging to be provided to the mobile computing device 150 using a wireless power source 200 as the source for the power. When a wireless power source 200 is unavailable, no power transfer occurs.

There exists a case where a device connected to the second data and power interface 102 of the apparatus 100 is capable of being either a load device 201 or a wired power source 202 (for example, when the mobile computing device is a USB OTG-enabled smartphone and the external device is another USB OTG-enabled smartphone). In such case, the configuration of the cable connecting the two devices dictates which device acts as the load device 201 and which device acts as the wired power source 202. For example, for two USB OTG-enabled smartphones connected by a USB-OTG-compatible cable, one end of the USB-OTG-compatible cable has an ID pin grounded while the other end of the USB-OTG-compatible cable has the ID pin in a not connected (NC) state. The smartphone connected to the end with the ID pin grounded acts as a "host" device that provides power to the smartphone connected to the end with the ID pin in the NC state, which acts as the load device 201.

Figure 3:
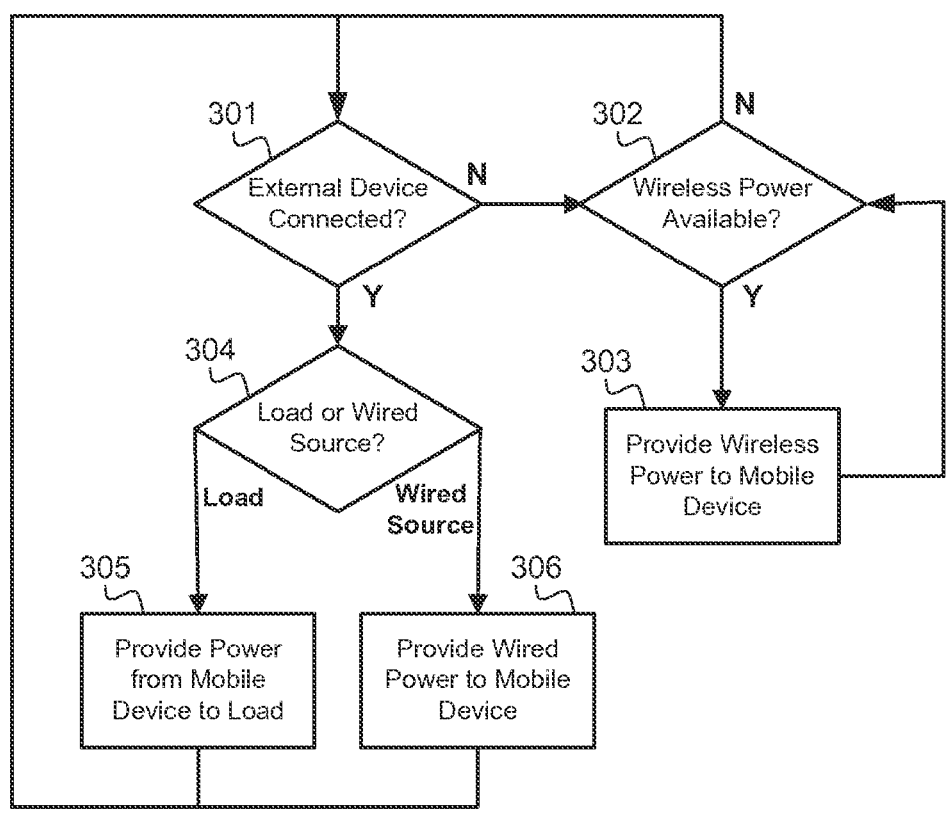
FIG. 3 is a flowchart illustrating a process flow corresponding to different modes of operation for an apparatus in an exemplary embodiment.

FIG. 3 is a flowchart illustrating a process flow for different modes of operation of the apparatus 100. At stages 301 and 304, the apparatus 100 detects whether an external device is connected to the second data and power interface 102 and, if so, determines whether the external device is a load device or a wired power source (e.g., based on the absence/presence of power at the second data and power interface 102 and based on a mode of operation of the wireless charging unit 110 set by the control unit 120). If a load device is connected, the apparatus 100 provides power from the mobile computing device 150 to the load device (stage 305). If a wired power source is connected, the apparatus 100 provides power to the mobile computing device 150 from the wired power source (stage 306). If no external device is connected to the second data and power interface 102 (stage 301), the apparatus 100 provides wireless power to the mobile computing device 150 from a wireless power receiver of the apparatus at stage 303 (if wireless power is available (stage 302)). If no external device is connected to the second data and power interface 102 (stage 301) and wireless power is unavailable (stage 302), no power transfer occurs with respect to the apparatus 100 until an external device is connected or wireless power becomes available.

In an exemplary embodiment, distinguishing between whether a connected external device is a load or a wired source at stage 304 is further based on the type of cable/connector used to connect the external device to the second data and power interface 102. In one example, where the second data and power interface 102 is a mini-USB port, the cable and connector used to connect an external load device to the mini-USB port should be USB OTG-compatible in order for the apparatus 100 to recognize that the connected device needs to draw power from the mobile computing device 150. An ID pin of a USB OTG-compatible cable/connector is grounded, which indicates to the apparatus that the cable/connector is USB OTG-compatible such that the apparatus 100 treats the connected external device is a load device that will draw power from the mobile computing device 150 via the second data and power interface 102.

On the other hand, when the ID pin of a USB cable/connector connected to the mini-USB port of the apparatus 100 is not grounded and instead is not connected (N.C.), this indicates to the apparatus 100 that the cable/connector is not USB OTG-compatible and that the connected external device will not be drawing power from the mobile computing device 150. In this case, if the connected external device (or other wired power source) which is not USB OTG-compatible is providing power via a power pin of the mini-USB port (i.e., the second data and power interface 102), the apparatus 100 provides wired charging to the mobile computing device 150 using the external device as a wired power source.

Figure 4:
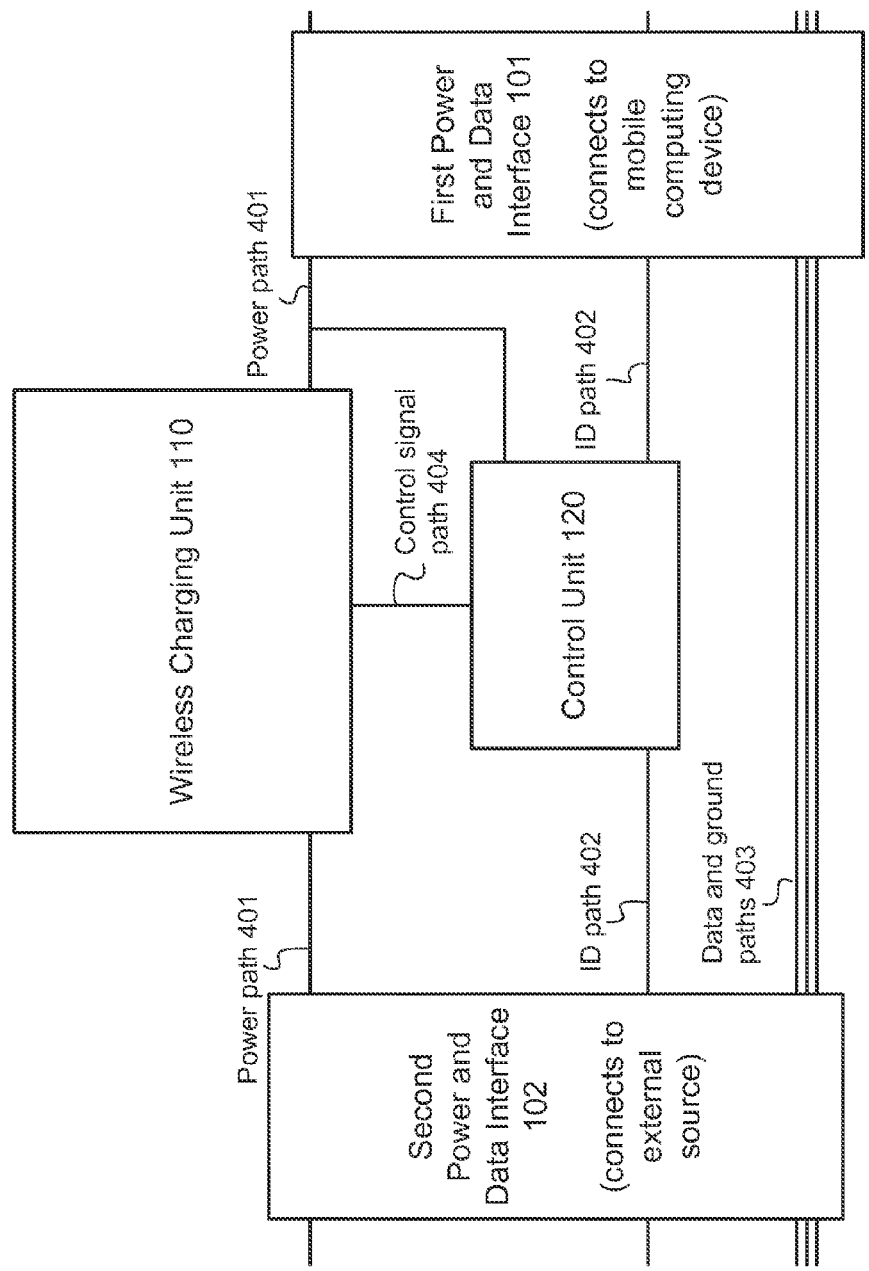
FIG. 4 is a block diagram illustrating connections between components of an apparatus in an exemplary embodiment.

FIG. 4 is a block diagram that further illustrates the relationship between components of the apparatus 100. When an external source (i.e., a load device or a wired power source) is connected to the second data and power interface 102, an ID path 402 provided between the first and second data and power interfaces 101 and 102 that is utilized by the control unit 120 allows the control unit 120 to provide an appropriate control signal to the wireless charging unit 110 via the control signal path 404. For example, if a USB OTG-compatible USB connector/cable is inserted to the second data and power interface 102 of the apparatus 100, the control unit 120 sends a control signal along the control signal path 404 to the wireless charging unit 110 based on a ground being connected to an ID pin of the second data and power interface 102 on the ID path 402 that puts the apparatus 100 in a state such that wireless charging and wired charging of the mobile computing device 150 are suspended/disabled, and such that the mobile computing device 150 provides power along power path 401 to the external device connected via the USB OTG-compatible USB connector/cable.

On the other hand, if a non-USB OTG-compatible USB connector/cable is at the second data and power interface 102 (or if nothing is connected at the second data and power interface 102), the control unit 120 sends a different control signal to the wireless charging unit 110 based on the ID path 402 being in a not connected (N.C.) state (as opposed to being in a grounded state). If an external wired power source is connected, the wireless charging unit (which is in an appropriate mode of operation based on a control signal from the control unit) suspends wireless charging and allows power to flow from the wired power source to the mobile computing device 150 via the non-USB OTG-compatible USB connector/cable and via the data and power interfaces 101 and 102 along the entirety of power path 401. If nothing is connected to the second data and power interface 102, the control unit 120 and the wireless charging unit 110 allow for wireless power to be provided to the mobile computing device 150 via the part of the power path 401 that connects the wireless charging unit 110 to the first data and power interface 101, while no power is transmitted or received on the part of the power path 401 that connects the wireless charging unit 110 to the second data and power interface 102.

In a particular exemplary implementation, the wireless charging unit 110 is a Qi-type wireless charging unit that includes a TI BQ51013 IC as the wireless charging IC. This exemplary implementation of the invention using the TI BQ51013 IC further includes a dual P-channel MOSFET load switch, the MTM68411 loadswitch. Further details regarding the TI BQ51013 IC are described in Texas Instruments, "bq51010, bq51011, bq51013: Integrated Wireless Power Supply Receiver, Qi (Wireless Power Consortium) Compliant," April 2011 (Revised August 2011), which is incorporated by reference herein it is entirety. Further details regarding the MTM68411 loadswitch are described in Panasonic, "MTM68411 Silicon P-channel MOS FET," January 2012, which is incorporated by reference herein it is entirety.

The TI BQ51013 includes two "Enable" pins, EN1 and EN2, which allows for four different modes of operation. Two of these four modes are used in exemplary embodiments of the invention, and these two modes are shown in the table below:

| EN1 | EN2 | Result |
|---|---|---|
| 0 | 0 | This 0|0 mode represents a "normal" mode of operation. If power is present at an adapter input "AD" of the wireless charging IC, the wireless charging IC control a switch of the wireless charging unit to allow a power output that from the wireless charging unit that uses the power provided at the adapter input as the power source (wired charging). If power is not present at the adapter input, wireless power from the wireless power receiver of the wireless charging unit is used as the power source and is output from the wireless charging unit (given that a wireless power source is available). |
| 1 | 0 | This 1|0 mode causes an adapter-enable output "AD-EN" of the wireless charging IC to be kept low regardless of whether an adapter voltage is present or not. The AD-EN output is usable in combination with a switch of the wireless charging unit to control power flow. |

The two of the four modes that are not used in the exemplary embodiments of the invention are shown in the table below:

| EN1 | EN2 | Result |
|---|---|---|
| 0 | 1 | Power provided through an adapter input will not be used as a power source in this mode, but wireless charging is enabled in this mode and wireless charging is used to provide power whenever a wireless power source is available. |
| 1 | 1 | Neither the adapter input nor wireless power receiver is used as a power source in this mode. |

Although these modes of operation of the wireless charging IC are not used in the exemplary embodiments described herein, one skilled in the art could modify the control logic to accomplish similar results using various combinations of the 0|0, 0|1, 1|0, and 1|1 modes of operation of the wireless charging IC without departing from the inventive principles. For example, in the exemplary embodiment discussed below, it would be possible to use the 1|1 mode in lieu of the 1|0 mode, since in either case power would not be provided from the wireless power output or the adapter input of the wireless charging IC.

It will be appreciated that other wireless charging ICs (such as wireless charging ICs manufactured by Toshiba, Panasonic, Rohm and IDT) provide similar input pins that correspond to different modes of operation for corresponding wireless charging units (or variations thereof), and that these other wireless charging ICs are also usable in connection with embodiments of the invention. Other types of loadswitches are usable in other embodiments as well.

Figure 5A:
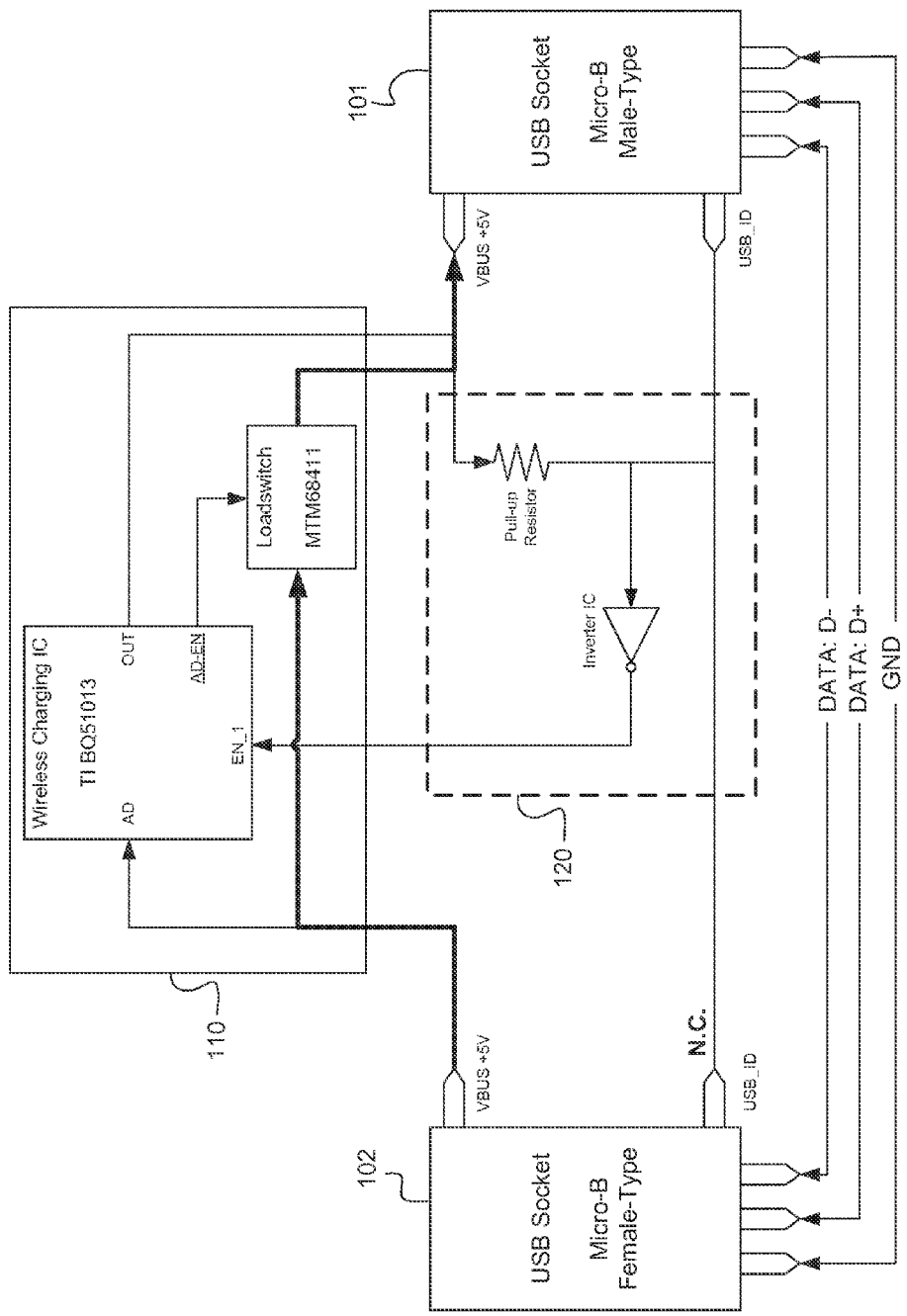
FIGS. 5A-5C are block diagrams illustrating connections between components of the apparatus in different modes of operation in an exemplary embodiment.
Figure 5B:
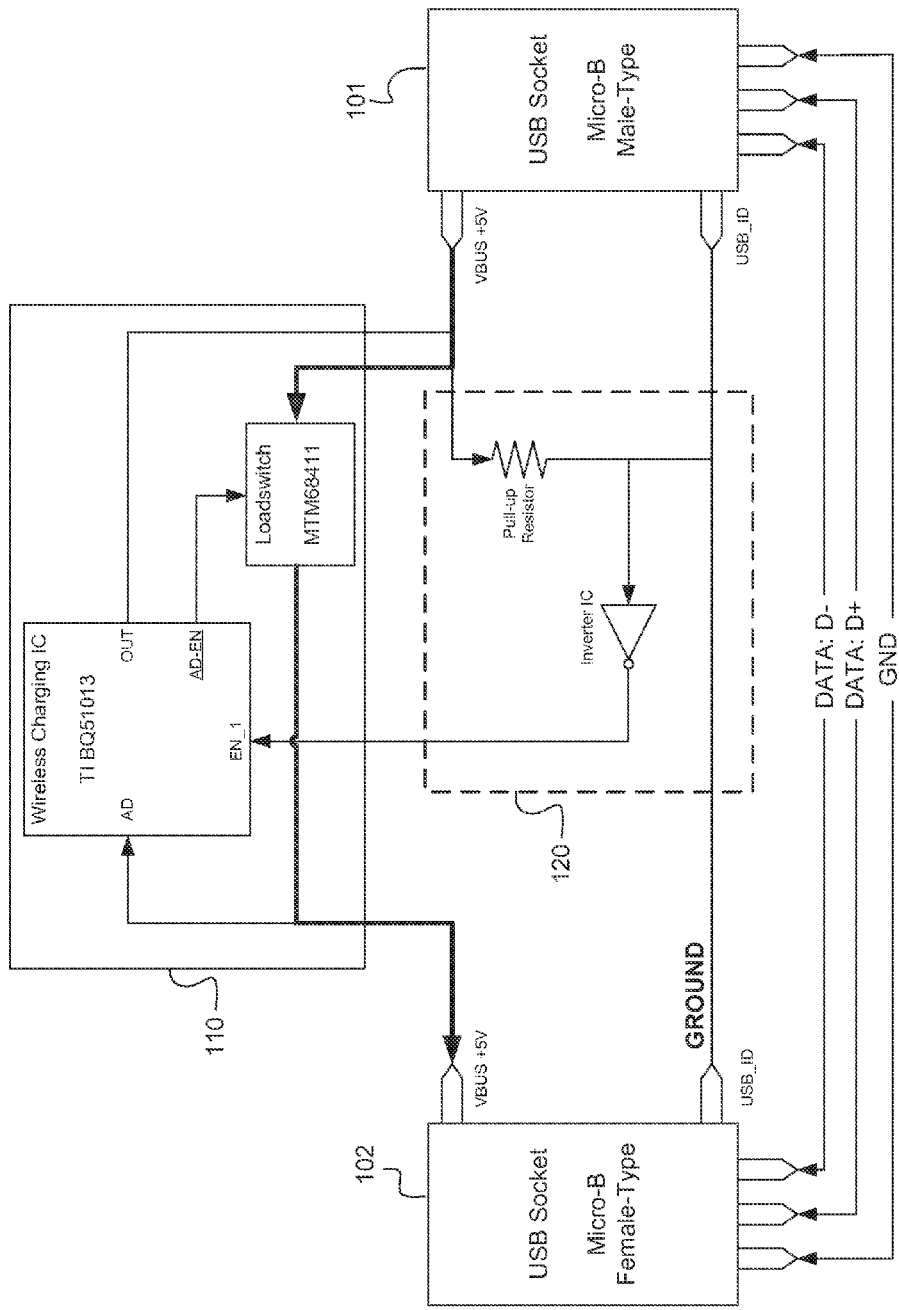
Figure 5C:
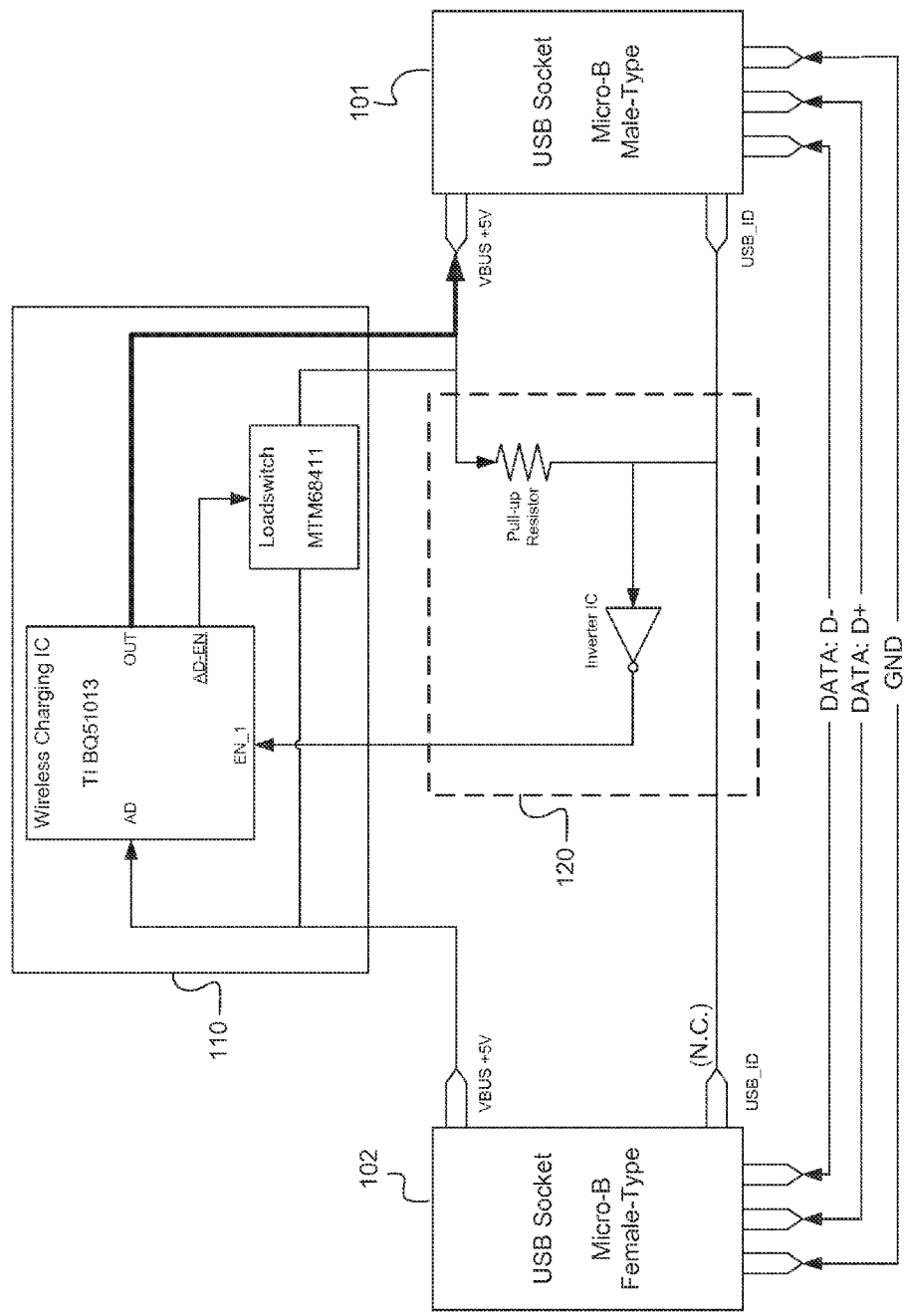

FIGS. 5A-5C depict components of this exemplary implementation of the invention in different modes of operation, given that a USB OTG-enabled mobile computing device 150 is connected to the first data and power interface 101 of the apparatus 100. These figures depict the second data and power interface 102 as a female-type micro-B USB socket having five pins (Vcc, D−, D+, ID, and Ground) and the first data and power interface 101 as a male-type micro-B USB connector having the same five pins. The control unit 120 in this exemplary implementation includes an inverter IC with an output connected to the EN1 pin of the wireless charging IC (and with a pull-up resistor connected to the input). The EN2 pin of the wireless charging IC (not depicted) is held to low or "0" in all modes of operation with respect to this exemplary implementation. It will be appreciated that the wireless charging unit 110 further includes a wireless power receiver (which is not depicted in FIGS. 5A-5C for simplicity).

FIG. 5A illustrates the apparatus 100 under conditions where a non-USB OTG-compatible USB connector/cable, corresponding to an external wired power source, is connected to the female-type micro-B USB socket. Power is provided via the Vcc pin of the female-type micro-B USB socket to the wireless charging unit 110, and the power detected at the AD input of the wireless charging IC causes the AD-EN output to register high, allowing power to flow across the load switch from the female-type USB socket to the male-type USB connector (i.e., from the external wired power source to the mobile computing device 150 joined with the apparatus 100).

Because the connector/cable is non-USB OTG-compatible, the ID pin of the female-type micro-B USB socket is in a not connected (N.C.) state. And because a high voltage is present at the power pin of the male-type USB connector, the inverter IC of the control unit 120 receives a high input and outputs low, causing the EN1 input of the wireless charging IC to register low or "0." This results in the wireless charging IC to be in a 0|0 state, and because an adapter voltage is present at the AD input, the wireless power output "OUT" is not being used to deliver power to the mobile computing device 150. Only the external wired power source connected to the female-type micro-B USB socket is delivering power to the mobile computing device 150 in this situation.

Data may also be communicated between the external wired power source and the mobile computing device 150 along the Data: D− and DATA: D+ lines between the female-type USB socket and the male-type USB connector of the apparatus 100 in appropriate circumstances (for example, where the external wired power source is another computing device).

FIG. 5B illustrates the apparatus 100 under conditions where a USB OTG-compatible connector/cable, corresponding to an external load device, is connected to the female-type micro-B USB socket. Because the connector/cable is USB OTG-compatible, the ID pin of the female-type micro-B USB socket is in a grounded state. This grounded state is passed along via the ID path to the male-type micro-B USB connector, and the mobile computing device 150 connected thereto is able to determine based on the presence of a ground at the ID pin of the male-type micro-B USB connector that a USB OTG-compatible load device is connected. This causes 5V power to be output from the mobile computing device 150 via the power pin of the male-type micro-B USB connector of the apparatus 100.

Because the ID path is grounded, a low value is input into the inverter IC and a high value is output from the inverter IC to the EN1 pin of the wireless charging IC. This puts the wireless charging IC into a 1|0 state, causing the AD-EN output pin of the wireless charging IC to be held low regardless of what is input into the AD input pin of the wireless charging IC. With the AD-EN output pin held low, the load switch allows power to flow from the male-type USB connector to the female-type USB socket (i.e., from the mobile computing device 150 to the external load device). Further, because power (and voltage) is present at the AD input of the wireless charging IC, wireless charging is suspended and the wireless charging output OUT of the wireless charging IC does not output wirelessly received power.

Data may also be communicated between the external load device and the mobile computing device 150 along the Data: D− and DATA: D+ lines between the female-type USB socket and the male-type USB connector of the apparatus 100.

FIG. 5C illustrates the apparatus 100 under conditions where nothing is connected to the female-type micro-B USB socket. Under these circumstances, the USB_ID pin of the female-type micro-B USB socket is in a not connected (N.C.) state, and the AD input to the wireless charging IC is low because no power is being provided or received at the power pin of the female-type USB socket. This puts the wireless charging IC into the 0|0 mode of operation where wireless power is provided when no power is detected at the AD input, causing the wireless power output OUT to provide power to the male-type USB connector (and to the mobile computing device 150 connected thereto)—i.e., so as to provide wireless charging to the mobile computing device 150.

Figure 6:
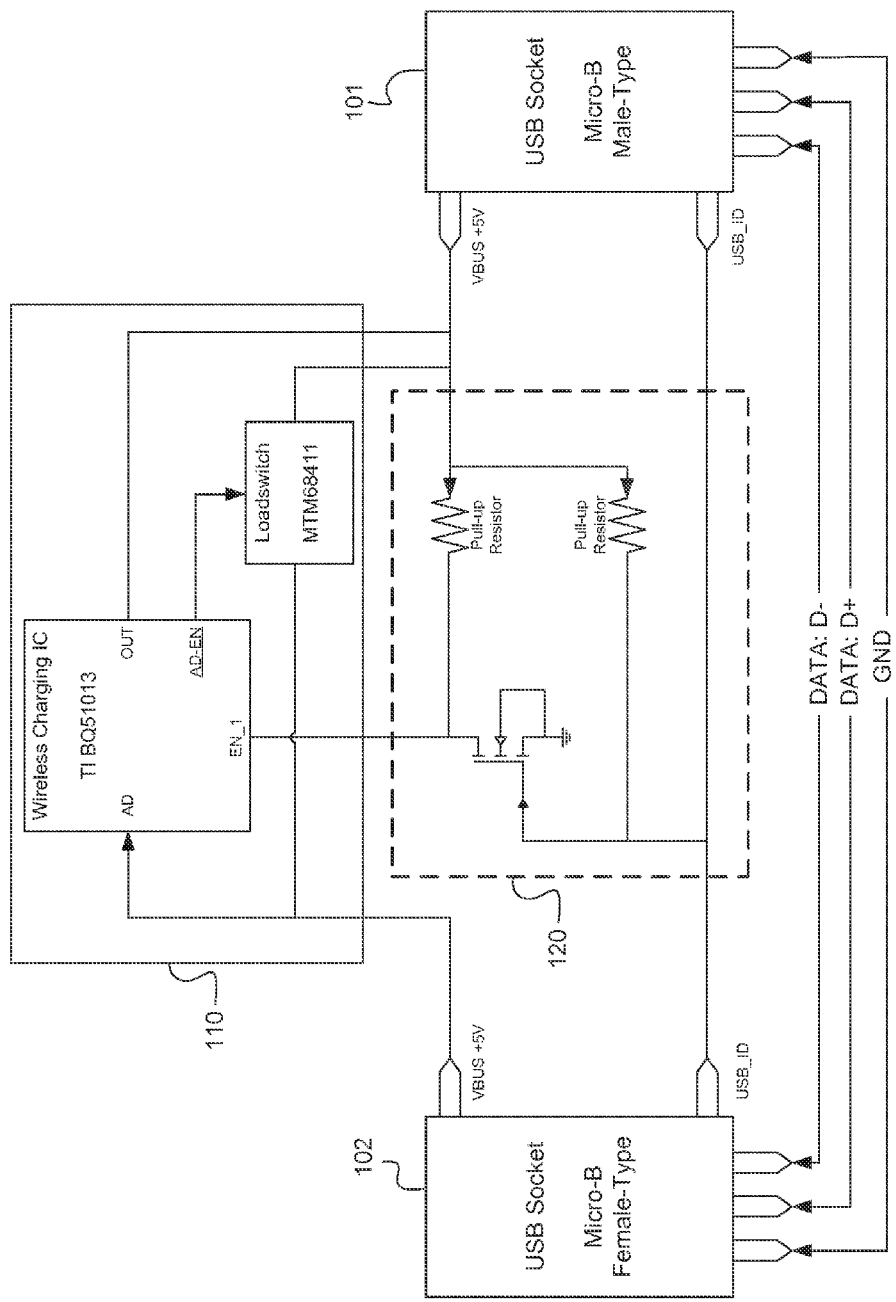
FIG. 6 is a block diagram illustrating components of the apparatus in an alternative exemplary embodiment.

FIGS. 5A-5C depict an exemplary implementation where the control unit 120 comprises an inverter IC and a pull-up resistors. It will be appreciated that other implementations of the control unit 120 are possible without departing from the inventive principles. FIG. 6 depicts an example of one such implementation where the control unit 120 includes a transistor and two pull-up resistors. The transistor-based implementation of the control unit 120 in FIG. 6 operates in the same way as discussed above with respect to FIGS. 5A-5C, providing a suitable output to the EN_1 input pin of the wireless charging IC such that the operation of the control unit 120 and the wireless charging unit 110 provide different modes of operation for the apparatus under different conditions. Further, as discussed above, in other alternative exemplary implementations, the control unit 120 may be a processor-based controller utilizing processor-executable instructions stored on a non-transitory processor-readable medium to switch the apparatus between different modes of operation, wherein the controller has similar inputs from an ID pin of the second data and power interface 102 and the power pin from the first data and power interface 101, and similar output to the wireless charging unit 110.

The embodiments discussed above with respect to FIGS. 1-6 relate to systems in which the apparatus 100 providing different modes of operation is separate from the mobile computing device 150. Other embodiments of the system include configurations where the control unit 120 and the wireless charging unit 110 are integrated in the mobile computing device 150. In these integrated embodiments, a first data and power interface 101 may be omitted, and the second data and power interface 102 is conceptually substituted with the data and power interface 151 of the mobile computing device 150 itself.

Figure 7:
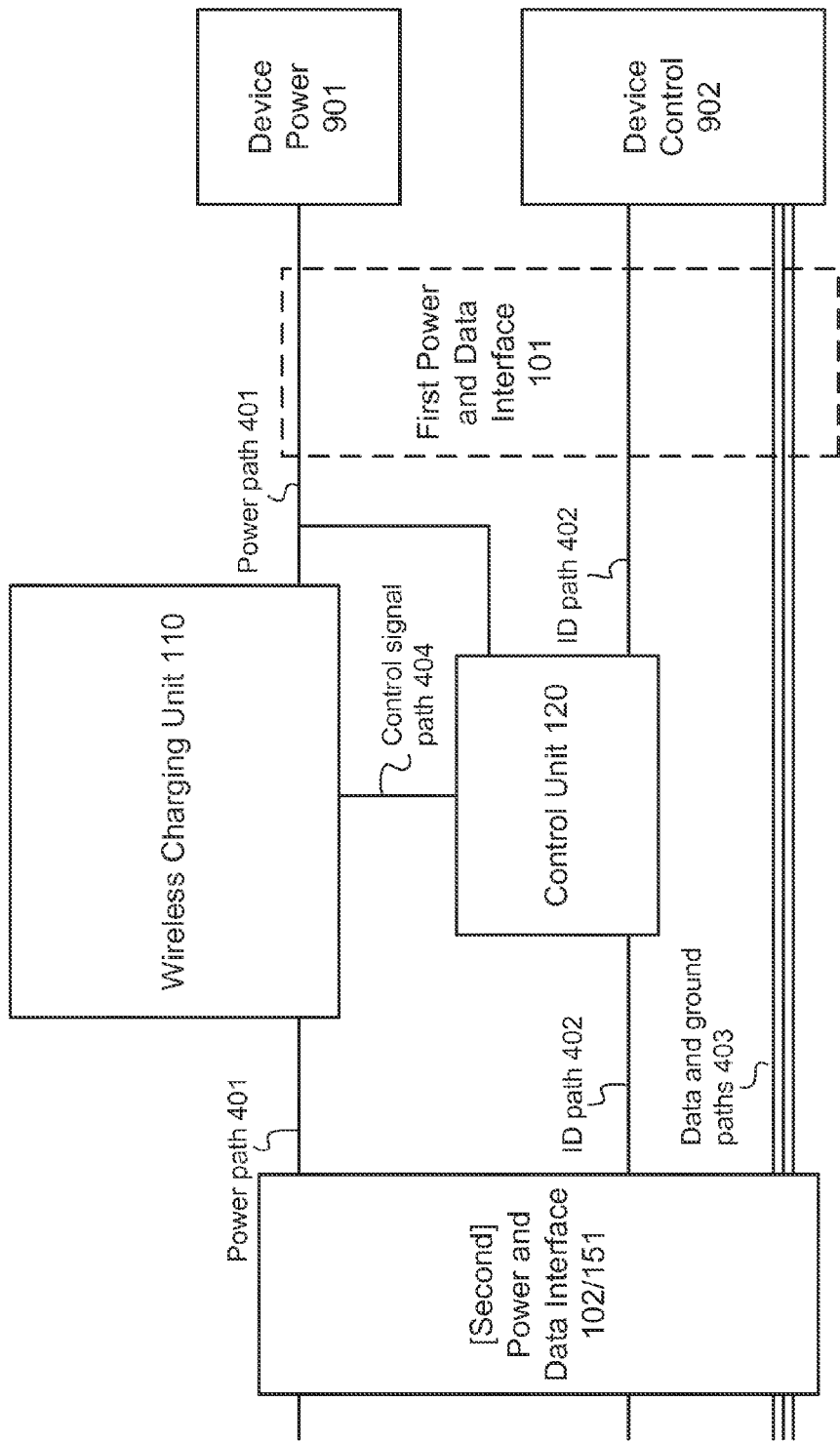
FIG. 7 is a block diagram illustrating components of a system in an exemplary embodiment.

FIG. 7 is a block diagram illustrating these different arrangements. In a system including an apparatus 100 and a mobile computing device 150 as separate entities, the system includes the first data and power interface 101 and the second data and power interface 102, and the power path 401, ID path 402, and the data and ground paths 403, extend through the first data and power interface 101 to appropriate connections in the mobile computing device 150. For example, the power path 401 connects to a device power unit 901 (such as the battery of a mobile computing device), and the ID path 402 and data and ground paths 403 connects to a device controller 902 (e.g., the processor-based control system of a mobile computing device).

In other embodiments where the system includes the control unit 120 and wireless charging unit 110 integrated into a mobile computing device 150, the wireless charging unit 110 and control unit 120 are part of the mobile computing device 150 such that the power path 401 and ID path 402 connect from the data and power interface 151 of the mobile computing device 150 to a device power unit 901 and a device control unit 902 of the mobile computing device 150. The wireless charging unit 110 and control unit 120, which are integrated in the mobile computing device 150, provide for different modes of operation to the mobile computing device 150 in which: (1) the mobile computing device delivers power to an external load device; (2) the mobile computing device receives power from an external wired power source; and (3) the mobile computing device is wirelessly charged via the integrated wireless charging unit. These integrated embodiments utilize the data and power interface 151 of the mobile computing device 150, and a separate apparatus having the first and second data and power interfaces 101 and 102 would not be needed.

Figure 8:
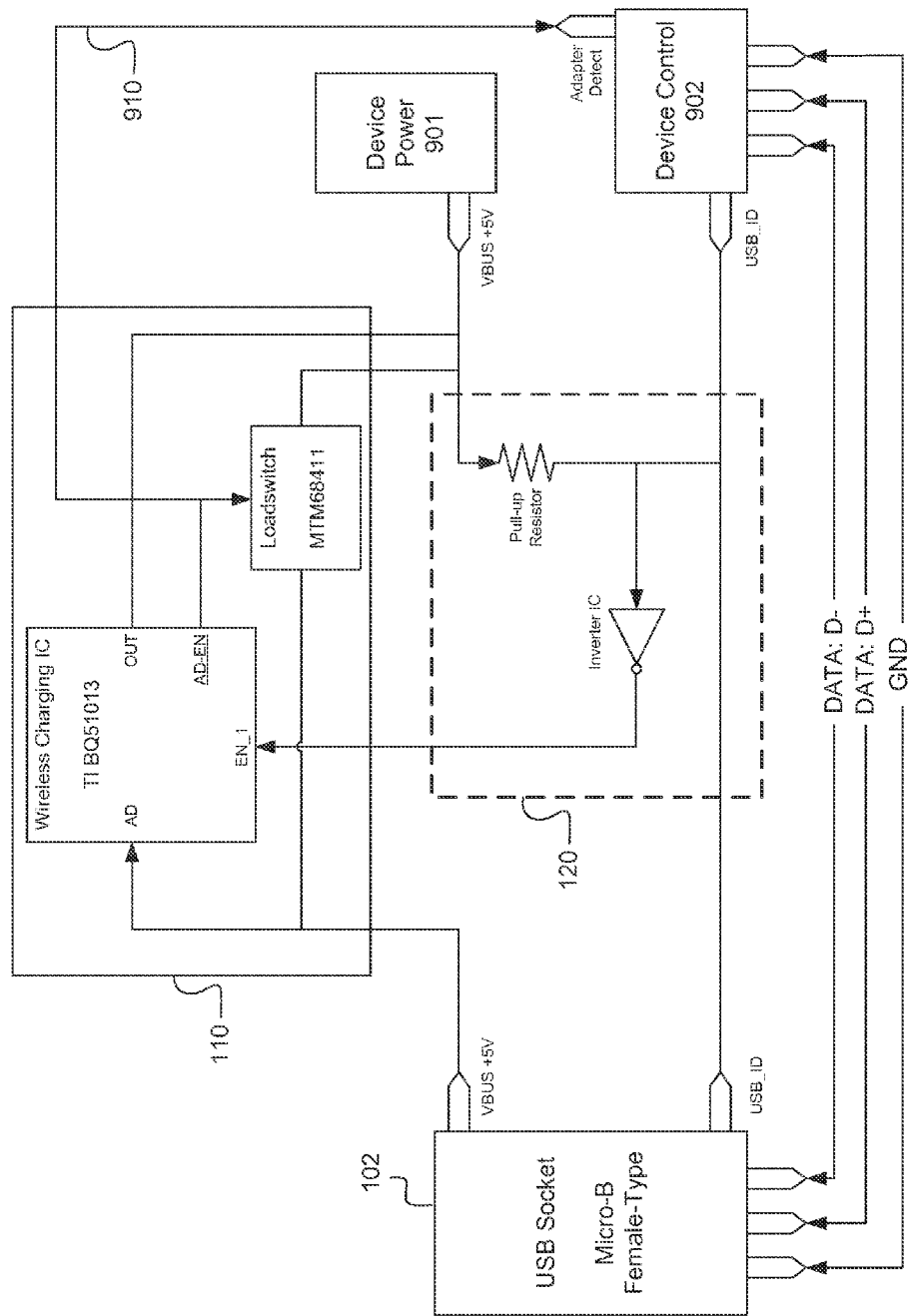
FIG. 8 is a block diagram illustrating components of a mobile computing device in an exemplary embodiment.

In a further embodiment, where the mobile computing device 150 incorporates the wireless charging unit 110 and the control unit 120, the mobile computing device 150 is further configured such that an "adapter detect" input of the device control unit 902 (e.g., a GPIO pin available on the mobile computing device's control unit) is connected to the loadswitch of the wireless charging unit 110, as depicted in FIG. 8, such that the mobile computing device 150 is able to set different charging rates for wireless charging versus wired charging. Because the AD-EN pin on the wireless charging IC is held low when a wired power source is connected to the data and power interface 151 (the USB socket) of the mobile computing device 150, this configuration allows the device control 902 sets a charging rate that is appropriate for wired charging (e.g., 500 mA for charging using the USB 2.0 specification) by detecting that the AD-EN pin is low via a detection line 910. When there is a high signal output from the AD-EN pin (and thus a high signal detected at the "adapter detect" input of the device control 902), the device control 902 allows for a different charging rate that is appropriate for wireless charging (e.g., 1 A).

It will be appreciated that, in the context of the exemplary embodiment shown in FIG. 8, in the case where a USB OTG-compatible cable/connector with a grounded ID pin is connected to the data and power interface 151, the mobile computing device 150 will still act as a "host" device and provide power to a load device 201 connected via the USB OTG-compatible cable/connector, similar to the previous exemplary embodiments discussed above.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An apparatus for wirelessly charging a mobile computing device and utilizing the mobile computing device as a power source, the apparatus comprising:
   a first data and power interface, adapted to be connected to a data and power port of the mobile computing device;
   a second data and power interface, adapted to be connected to a wired power source or load device;
   a wireless charging unit, comprising a power receiver adapted to wirelessly receive power from a wireless power source; and
   a control unit, configured to control the wireless charging unit;
   wherein the wireless charging unit and the control unit are configured to provide multiple modes of operation for the apparatus;
   wherein a first mode of operation of the apparatus includes the load device being connected to the apparatus via the second data and power interface with power being delivered from the mobile computing device to the load device via the first and second data and power interfaces;
   wherein a second mode of operation of the apparatus includes the wired power source being connected to the apparatus via the second data and power interface with power being delivered to the mobile computing device from the wired power source via the first and second data and power interfaces; and
   wherein a third mode of operation of the apparatus includes the wireless power source wirelessly providing power to the power receiver of the wireless charging unit, with the wireless charging unit delivering power to the mobile computing device via the first data and power interface.

2. The apparatus according to claim 1, wherein the wireless charging unit and the control unit are configured to utilize the third mode of operation under conditions where no load device or wired power source is connected to the apparatus via the second data and power interface and power is available from the wireless power source.

3. The apparatus according to claim 1, wherein the wireless charging unit further comprises a wireless charging controller, the wireless charging controller including an input pin that controls a mode of operation of the wireless charging unit, and wherein the operation of the wireless charging unit and the control unit are configured to suspend wireless charging in the first and second modes of operation of the apparatus and enable wireless charging in the third mode of operation of the apparatus.

4. The apparatus according to claim 3, wherein the control unit comprises an inverter or a transistor and the control unit is configured such that the inverter or the transistor causes a value to be output to the input pin of the wireless charging controller to enable wireless charging under conditions where no load device and no wired power source are connected to the apparatus via the second data and power interface.

5. The apparatus according to claim 3, wherein the control unit comprises an inverter or a transistor and the control unit is configured such that the inverter or the transistor causes a value to be output to the input pin of the wireless charging controller to suspend wireless charging under conditions where a load device or a wired power source is connected to the apparatus via the second data and power interface.

6. The apparatus according to claim 1, wherein an ID pin of the first data and power interface is in communication with an ID pin of the second data and power interface.

7. The apparatus according to claim 6, wherein the control unit is configured to provide the first mode of operation based on the ID pin of the first data and power interface being grounded.

8. The apparatus according to claim 1, wherein the wireless charging unit further comprises a wireless charging controller, the wireless charging controller including an input pin that controls a mode of operation of the wireless charging controller;
wherein the control unit is configured to control the wireless charging unit via the input pin of the wireless charging controller so as to suspend wireless charging in the first and second modes of operation of the apparatus and to enable wireless charging in the third mode of operation of the apparatus; and
wherein a pin of the second data and power interface adapted to be connected to the wired power source is connected to another input pin of the wireless charging controller.

9. A system comprising:
a mobile computing device; and
an apparatus for wirelessly charging the mobile computing device and utilizing the mobile computing device as a power source, the apparatus comprising:
a first data and power interface, adapted to be connected to a data and power port of the mobile computing device;
a second data and power interface, adapted to be connected to a wired power source or load device;
a wireless charging unit, comprising a power receiver adapted to wirelessly receive power from a wireless power source; and
a control unit, configured to control the wireless charging unit;
wherein the wireless charging unit and the control unit are configured to provide multiple modes of operation for the apparatus;
wherein a first mode of operation of the apparatus includes the load device being connected to the apparatus via the second data and power interface with power being delivered from the mobile computing device to the load device via the first and second data and power interfaces;
wherein a second mode of operation of the apparatus includes the wired power source being connected to the apparatus via the second data and power interface with power being delivered to the mobile computing device from the wired power source via the first and second data and power interfaces; and wherein a third mode of operation of the apparatus includes the wireless power source wirelessly providing power to the power receiver of the wireless charging unit, with the wireless charging unit delivering power to the mobile computing device via the first data and power interface.

10. The system according to claim 9, wherein the wireless charging unit further comprises a wireless charging controller, the wireless charging controller including an input pin that controls a mode of operation of the wireless charging unit;
wherein the control unit is configured to control the wireless charging unit via the input pin of the wireless charging controller to suspend wireless charging in the first and second modes and enable wireless charging in the third mode; and
wherein a pin of the second data and power interface adapted to be connected to the wired power source is connected to another input pin of the wireless charging controller.

11. The system according to claim 9, further comprising:
a device control unit configured to control a charging rate associated with charging the mobile computing device in the second and third modes of operation, wherein the charging rate for the mobile computing device in the second mode of operation is different from the charging rate for the mobile computing device in the third mode of operation.

12. The system according to claim 9, wherein the wireless charging unit and the control unit are configured to utilize the third mode of operation under conditions where no device is connected to the apparatus via the second data and power interface and power is available from the wireless power source.

13. The system according to claim 9, wherein the wireless charging unit further comprises a wireless charging controller, the wireless charging controller including an input pin that controls a mode of operation of the wireless charging unit, and wherein the control unit is configured to control the wireless charging unit via the input pin of the wireless charging controller to suspend wireless charging in the first and second modes and enable wireless charging in the third mode.

14. The system according to claim 13, wherein the control unit comprises an inverter or a transistor and the control unit is configured such that the inverter or the transistor causes a value to be output to the input pin of the wireless charging controller to enable wireless charging under conditions where no load device and no wired power source are connected to the apparatus via the second data and power interface.

15. A method for providing wireless charging to a mobile computing device and using the mobile computing device as a power source for a load device, the method comprising:
determining, via a control unit in communication with a wireless charging unit, whether a mobile computing device is connected to a first data and power interface of an apparatus and whether a wired power source, a load device, or nothing is connected to a second data and power interface of the apparatus; and
determining, via the control unit and the wireless charging unit, a mode of operation for the apparatus based on the determining;
wherein a first mode of operation of the apparatus includes the load device being connected to the apparatus via the second data and power interface with power being delivered from the mobile computing device to the load device via the first and second data and power interfaces;

wherein a second mode of operation of the apparatus includes the wired power source being connected to the apparatus via the second data and power interface with power being delivered to the mobile computing device from the wired power source via the first and second data and power interfaces; and wherein a third mode of operation of the apparatus includes a wireless power source wirelessly providing power to the power receiver of the wireless charging unit, with the wireless charging unit delivering power to the mobile computing device via the first data and power interface.

16. The method according to claim 15, wherein delivering power to the mobile computing device from the wired power source in the second mode of operation and delivering power to the mobile computing device from the wireless power source in the third mode of operation are performed at different charging rates.

17. The method according to claim 15, wherein the wireless charging unit further comprises a wireless charging controller, the wireless charging controller including an input pin that controls a mode of operation of the wireless charging unit, and wherein the control unit is configured to control the wireless charging unit via the input pin of the wireless charging controller.

* * * * *